(12) United States Patent
Specht

(10) Patent No.: US 6,470,788 B2
(45) Date of Patent: Oct. 29, 2002

(54) APPARATUS FOR MOVING AN OPERATING ELEMENT

(75) Inventor: Martin Specht, Feldafing (DE)

(73) Assignee: Breed Automotive Technology, Inc., Laskeland, FL (US)

( * ) Notice: Subject to any disclaimer, the term of this patent is extended or adjusted under 35 U.S.C. 154(b) by 38 days.

(21) Appl. No.: 09/828,584

(22) Filed: Apr. 4, 2001

(65) Prior Publication Data

US 2002/0067004 A1 Jun. 6, 2002

(30) Foreign Application Priority Data

Dec. 6, 2000 (DE) .................................. 200 20 695 U

(51) Int. Cl.[7] .......................... F15B 15/26; F01B 31/10; F16J 1/00
(52) U.S. Cl. ............................... 92/23; 92/155; 92/172
(58) Field of Search ........................ 92/15, 23, 155, 92/158, 159, 172; 280/741

(56) References Cited

U.S. PATENT DOCUMENTS

| | | | | |
|---|---|---|---|---|
| 1,964,671 A | * | 6/1934 | Nesbitt ..................... | 92/155 X |
| 2,607,342 A | * | 8/1952 | Abel ......................... | 92/155 X |
| 3,212,411 A | * | 10/1965 | Storms ..................... | 92/155 X |
| 3,545,343 A | * | 12/1970 | Orbeck ..................... | 92/23 X |
| 4,867,317 A | * | 9/1989 | Wildemann et al. ........ | 92/15 X |
| 5,941,160 A | * | 8/1999 | Kaot et al. ................ | 92/155 |

* cited by examiner

Primary Examiner—John E. Ryznic
(74) Attorney, Agent, or Firm—Lonnie Drayer

(57) ABSTRACT

An apparatus for moving an operating element has a guide surface along which the operating element may be guided. A drive means provides a driving pulse exerted on the operating element for the movement of the operating element along the guide surface. A gap between the guide surface and the outer surface of the operating element is filled by a layer of a material that acts as an adhesive layer when the operating element is at rest and as a lubricating layer when the operating element is in motion. The outside of the operating element may have a conical profile and the guide surface may have a cylindrical profile, with the gap between the guide surface and the outer surface of the operating element becoming progressively larger in the direction of movement of the operating element. The layer of material in the gap may be a dry or solid lubricant, comprising material such as MoS2 or polytetrafluoroethylene.

18 Claims, 1 Drawing Sheet

APPARATUS FOR MOVING AN OPERATING ELEMENT

FIELD OF THE INVENTION

The invention relates to an apparatus for moving an operating element within a cavity surrounded by a guide surface, the operating element being used for example to open a vessel containing gas used to inflate a vehicle airbag.

BACKGROUND OF THE INVENTION

An apparatus of the type disclosed herein is used in the movement of structural parts that are used for opening or closing or for adjusting cross-sections of a flow path, for example the flow path of a gas. Normally, the operating element is driven in a pulsed manner in dependence on a sensor signal, in which case the required operating movement or actuation movement caused by the operating element is to be triggered within a short time, in the order of magnitude of a few milliseconds. Mechanisms of this type are used for example for opening vessels containing gas used to inflate airbags. The movement mechanism used in this very rapid operation necessitates a high degree of precision as regards the dimensions of the operating element and the guide surface, with at the same time a large number of components. Furthermore, when the structural parts to be moved by the operating element, such as flap valves, supports and the like, are impacted by the operating element high reaction forces are generated. Problem-free guidance of the operating element within the cavity enclosed by the guide surface must be guaranteed during the rapid movement of the operating element without tilting moments or the like having a disadvantageous effect on this guided movement. Preferably, a pyrotechnic drive is used as the drive means generating the driving pulse.

There is provided in accordance with the present invention an apparatus for moving an operating element along a guide surface surrounding the operating element. A drive means provides a driving pulse exerted on the operating element for the movement of the operating element along the guide surface. A gap between the guide surface and the outer surface of the operating element is filled by a layer of a material that acts as an adhesive layer when the operating element is at rest and as a lubricating layer when the operating element is in motion. The outside of the operating element may have a conical profile, with the gap between the guide surface and the outer surface of the operating element becoming progressively larger in the direction of movement of the operating element. The layer of material in the gap may be a dry or solid lubricant, such as MoS2 or polytetrafluoroethylene.

BRIEF DESCRIPTION OF THE DRAWING

The sole drawing FIGURE shows diagrammatically, in a partially sectional representation, an exemplary embodiment of the invention.

DETAILED DESCRIPTION OF THE INVENTION

Figure 1:
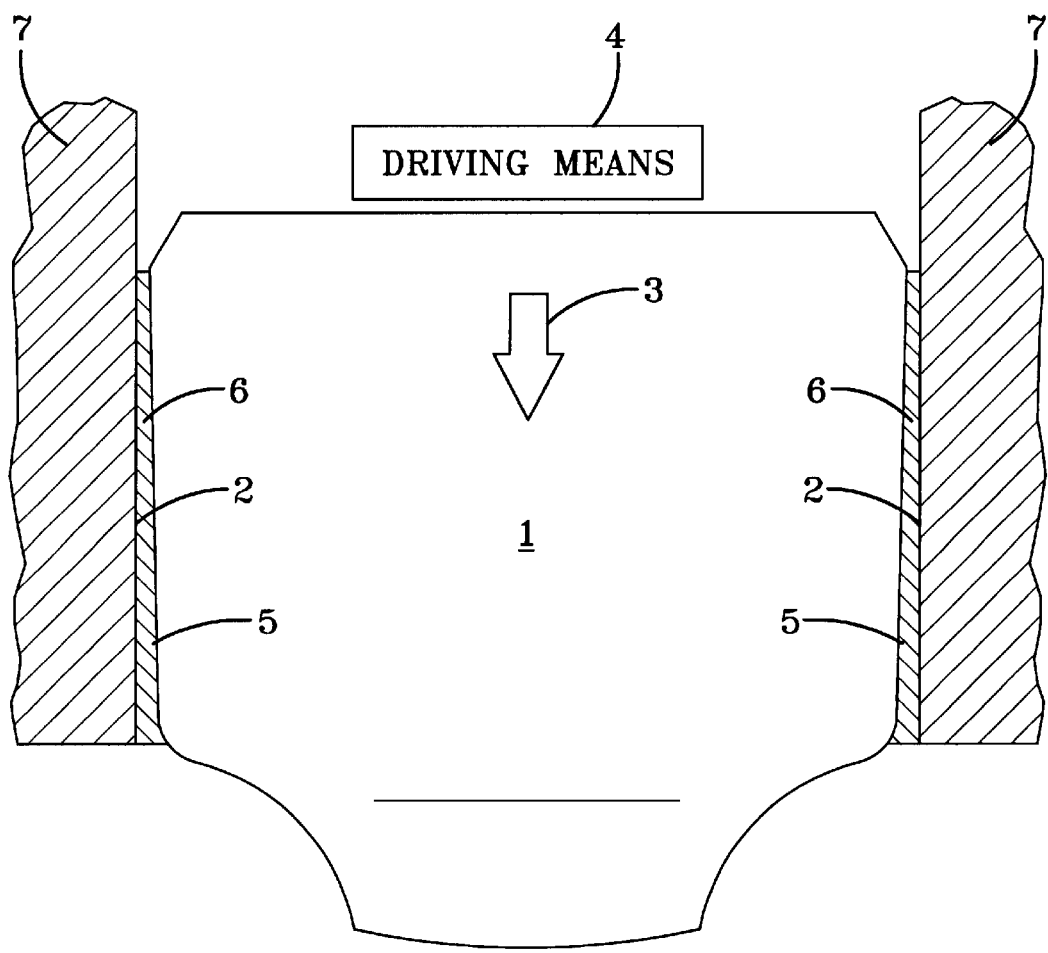

The figure shows diagrammatically, in a partially sectional representation, an exemplary embodiment of the invention. A piston-shaped operating element 1 is located within a preferably cylindrical cavity that is enclosed by a wall 7. The cavity is surrounded by a guide surface 2, with the guide surface 2 being of hollow cylindrical construction. Between the outside, peripheral face, 5 of the operating element 1 and the guide surface 2 there is formed a gap.

In the exemplary embodiment illustrated, only the outside, peripheral face, 5 of the operating element 1 has a conical, or frustoconical, construction. The guide surface 2 is preferably cylindrical and extends parallel to an axial direction of movement 3 of the driven operating element 1 and extends around the operating element. The cross-section of the guide surface and the complementary cross-section of the operating element, taken perpendicular to an axial direction of movement 3 of the driven operating elements may be circular, oval or polygonal, e.g. rectangular or square. The width of the gap between the guide surface 2 and the outside 5 of the operating element 1 progressively and continuously widens in the direction of movement 3 of the operating element. In the drawing figure the taper of the gap is exaggerated for illustration purposes. This gap is filled with a layer 6 of a material that acts as an adhesive layer when the operating element 1 is at rest and as a lubricating layer when the operating element is in motion.

The layer of material 6 is preferably applied to the outside 5, peripheral face, of the operating element 1 as a coating before assembly with the guide surface, with subsequent curing, before the operating element is inserted into the cavity. When the operating element is inserted into the cavity enclosed by the guide surface, the layer of material in the narrower region of the gap is compressed or compacted in comparison with the material in the wider region of the gap. This produces the necessary holding force to secure the operating element against the guide surface, while at the same time compensating for manufacturing tolerances. Preferably, therefore, the layer of material 6 has elastic or thermoelastic properties. The layer of material 6 extends at least along the outside 5 of the operating element 1.

The operating element 1 serves to actuate a structural element, not illustrated in more detail and located in the path of movement of the operating element 1, for example a flap valve, a support or the like. The operating element 1 is driven by a drive means 4 that exerts a brief driving pulse on the operating element 1. This driving pulse may be generated by a pyrotechnic propellant in the drive means 4. The drive means 4 may be arranged in a space behind the operating element 1 or within the operating element.

Because of the conical shape of the outside 5 of the operating element 1 in conjunction with the cylindrical shape of the guide surface, in an exemplary device the gap width at the widest point may be approximately 0.020 mm and at the narrowest point approximately 0.005 mm. The length of the operating element 1 within the guide surface, that is to say the gap length filled with the layer of material 6, may be approximately 7 mm.

In the region of the narrower gap width in which the material 6 is compressed or compacted, not only is compensation for the manufacturing tolerances achieved, but a defined releasing force is established when the operating element 1 is installed in the cavity enclosed by the guide surface 2. This releasing force is overcome by the driving pulse of the drive means 4, which is in particular of pyrotechnic construction. The operating element 1 covers a relatively short path in order to move, or displace, a structural element such as flap valves, supports and the like associated with the closure of a vessel containing compressed gas (not shown). The free travel distance of the operating element 1 in the direction of movement 3 may be approximately 2 mm or less before it reaches the structural element. This corresponds to approximately one quarter of the guide distance of the operating element 1 within the cavity surrounded by the wall 7. The piston diameter of the operating element 1 may be approximately 10 mm to 12 mm at the center of its longitudinal extent.

Because of its conical construction, once it is released the operating element 1 moves towards the structural element to be actuated in a free-floating manner for about 1 mm to 2 mm as a result of the driving pulse generated by the drive means 4.

Until the release, the operating element 1 is held securely, within the cavity formed in the wall 7, by the layer of material 6, which acts as an adhesive layer. When the driving pulse generated by the drive means 4 allows the holding force of the adhesive layer to be overcome by the operating element, the operating element is driven in the direction of movement 3. During movement of the operating element the layer of material 6 acts as a lubricating layer that has the effect of an almost free-floating movement of the driven operating element.

To achieve these functions, the layer of material 6 in the gap is preferably based on a dry, solid lubricant system. The dry or solid lubricant may be polytetrafluoroethylene (PTFE) or MoS2. One example of a suitable coating system is polytetrafluoroethylene (PTFE) in a solvent, for example N-methyl pyrrolidone and a suitable binder, in particular an organic binder. A product of this type is commercially available under the name FLUOROPAN®. The coating, which is preferably applied to the peripheral face of the operating element, is cured under heat. This allows layer thicknesses in the order of magnitude of 10 $\mu$m to 25 $\mu$m and above to be produced, depending on the gap width to be filled.

A further exemplary embodiment of a coating system is based on a solid lubricant, preferably MoS2, an inorganic binder and a solvent, for example ester. Coating systems of this type are commercially available under the names UNI-MOLY® and MOLYKOTE®. This coating system can cure at room temperature. The respective coating system is applied in liquid form to the peripheral face of the operating element and cured. Layer thicknesses in the order of magnitude of 10 $\mu$m and above, for example 25 $\mu$m and more can again be formed, depending on the gap width.

Any changes and modification in the above described embodiment of the invention can, of course, be carried out without departing from the scope thereof. Accordingly, that scope is intended to be limited only by the scope of the appended claims.

What is claimed is:

1. An apparatus comprising an operating element, a guide surface that extends around the operating element and along which the operating element may be guided, and a drive means that provides a driving pulse exerted on the operating element for the movement of the operating element along the guide surface, a gap is located between the guide surface and an outer surface of the operating element, a material means disposed in the gap acts as an adhesive when the operating element is at rest and as a lubricant when the operating element is in motion.

2. The apparatus according to claim 1 wherein the outside of the operating element has a conical profile, with the gap between the guide surface and the outer surface of the operating element becoming progressively larger in the direction of movement of the operating element.

3. The apparatus according to claim 2 wherein the material means disposed in the gap is compacted in a region of the gap that is narrower, in comparison with the layer of material gap in a region of the gap that is wider.

4. The apparatus according to claim 1 wherein the layer of material in the gap comprises a dry or solid lubricant.

5. The apparatus according to claim 1 wherein the material means disposed in the gap comprises a material selected from the group consisting of MoS2 and polytetrafluoroethylene.

6. The apparatus according to claim 2 wherein the material means disposed in the gap comprises a material selected from the group consisting of MoS2 and polytetrafluoroethylene.

7. The apparatus according to claim 1 wherein the material means disposed in the gap is applied as a coating to the outside of the operating element.

8. The apparatus according to claim 1 wherein the material means disposed in the gap is formed from a cured coating system applied in a liquid state to the outside of the operating element.

9. An apparatus comprising an operating element, a guide surface that extends around the operating element and along which the operating element may be guided, and a drive means that provides a driving pulse exerted on the operating element for the movement of the operating element along the guide surface, the guide surface and an outer surface of the operating element are not parallel to one another, and a material that has both adhesive and lubricant properties is disposed in a gap between the guide surface and the outer surface of the operating element.

10. The apparatus according to claim 9 wherein the material disposed in the gap comprises a dry or solid lubricant.

11. The apparatus according to claim 9 wherein the material disposed in the gap comprises a material selected from the group consisting of MoS2 and polytetrafluoroethylene.

12. The apparatus according to claim 9 wherein the material disposed in the gap is compacted in a region of the gap that is narrower, in comparison with the layer of material gap in a region of the gap that is wider.

13. The apparatus according to claim 9 wherein the material disposed in the gap is applied as a coating to the outside of the operating element.

14. The apparatus according to claim 9 wherein the material disposed in the gap is formed from a cured coating system applied in a liquid state to the outside of the operating element.

15. The apparatus according to claim 9 wherein the outside of the operating element has a conical profile, with the gap between the guide surface and the outer surface of the operating element becoming progressively larger in the direction of movement of the operating element.

16. The apparatus according to claim 15 wherein the material disposed in the gap comprises a material selected from the group consisting of MoS2 and polytetrafluoroethylene.

17. A method of securing a piston within a cylinder comprising the steps of:

(a) providing a cylinder having a cylinder wall that can act as a guide surface;

(b) providing a piston having an outer surface and placing the piston inside the cylinder such that a gap exists between the cylinder wall and the outer surface of the piston and the cylinder wall and the outer surface of the piston are not parallel with one another; and (c) providing a material in the gap between the guide surface and the outer surface of the operating element that has both adhesive and lubricant properties.

18. The method of securing a piston within a cylinder according to claim 17 wherein in step (c) the material provided in the gap is selected from the group consisting of MoS2 and polytetrafluoroethylene.

* * * * *